(12) United States Patent
Gamlen (10) Patent No.: US 10,688,023 B2
(45) Date of Patent: Jun. 23, 2020

(54) TABLET PRESS

(71) Applicant: Gamlen Tableting Limited, Nottingham (GB)

(72) Inventor: Michael Gamlen, Nottingham (GB)

(73) Assignee: Gamlen Tableting Limited, Nottingham (GB)

( * ) Notice: Subject to any disclaimer, the term of this patent is extended or adjusted under 35 U.S.C. 154(b) by 255 days.

(21) Appl. No.: 15/909,080

(22) Filed: Mar. 1, 2018

(65) Prior Publication Data

US 2018/0221245 A1    Aug. 9, 2018

Related U.S. Application Data

(63) Continuation of application No. 13/982,547, filed as application No. PCT/GB2012/050145 on Jan. 24, 2012, now abandoned.

(30) Foreign Application Priority Data

Jan. 31, 2011    (GB) .................................. 1101603.7

(51) Int. Cl.
*A61J 3/06*    (2006.01)
*B30B 11/00*    (2006.01)
(Continued)

(52) U.S. Cl.
CPC ............... *A61J 3/06* (2013.01); *B30B 11/005* (2013.01); *B30B 11/025* (2013.01); *G01N 3/08* (2013.01); *G01N 2203/0284* (2013.01)

(58) Field of Classification Search
CPC ......... A61J 3/06; B30B 11/005; B30B 11/025
See application file for complete search history.

(56) References Cited

U.S. PATENT DOCUMENTS

| 214,849 A | 4/1879 | Smedley |
|---|---|---|
| 438,763 A | 10/1890 | Jordan |

(Continued)

FOREIGN PATENT DOCUMENTS

| CN | 2 478 765 Y | 2/2002 |
|---|---|---|
| CN | 2478765 | 2/2002 |

(Continued)

OTHER PUBLICATIONS

Gamlen, Michael, "GTP1 Demonstration.avi", Retrieved from the Internet: URL: http://www.youtube.com/watch?v=QLBFOrs5Wwk, Jul. 30, 2011, in 1 page.

(Continued)

*Primary Examiner* — James Sanders
(74) *Attorney, Agent, or Firm* — Knobbe Martens Olson & Bear, LLP (57) ABSTRACT

The invention concerns a tablet press (10) which is typically portable and comprises a base (12) and a press member (24) held relative to the base by a spacer (20). The base (12) comprises a die (38B) for receiving a powder in use, wherein the spacer (20) depends from the base and is moveable relative thereto under the control of an actuator (28) such that the press member (24) is reversibly actuable between an at-rest condition in which the press member is spaced from the die and an actuated condition in which the press member is located in the die so as to apply a load to a powder therein so as to compact the powder into a tablet. The actuator is operated under the control of an electronic controller, typically in response to desired tablet parameters input by a user. A table-top tablet press of this kind is particularly beneficial for individual or small-batch tablet production, for example for research purposes.

20 Claims, 5 Drawing Sheets

(51) Int. Cl.
  *B30B 11/02* (2006.01)
  *G01N 3/08* (2006.01)

(56) References Cited

U.S. PATENT DOCUMENTS

| | | |
|---|---|---|
| 4,781,567 A | 11/1988 | Miller, Jr. |
| 4,880,373 A | 11/1989 | Balog et al. |
| 5,407,339 A | 4/1995 | Fehlhafer |
| 5,417,903 A | 5/1995 | Harrison |
| 5,672,363 A | 9/1997 | Sagawa et al. |
| 5,829,347 A | 3/1998 | Hiruma |
| 6,585,507 B1 | 7/2003 | Kalidindi |
| 6,881,048 B1 | 4/2005 | Tokita |
| 2002/0009512 A1 | 1/2002 | Fairman et al. |
| 2003/0167938 A1 | 9/2003 | Olsson |
| 2004/0026812 A1 | 2/2004 | Pinthus et al. |
| 2009/0130243 A1 | 5/2009 | Inoue et al. |
| 2014/0007784 A1 | 1/2014 | Gamlen |

FOREIGN PATENT DOCUMENTS

| | | |
|---|---|---|
| CN | 2480148 | 3/2002 |
| DE | 296 08 808 | 8/1996 |
| DE | 296 08 808 U1 | 8/1996 |
| DE | 10256654 | 6/2004 |
| DE | 1025664 | 4/2009 |
| EP | 0 691 121 | 1/1996 |
| GB | 377088 A | 7/1982 |
| JP | 63-168296 A | 7/1988 |
| JP | H01-027795 | 1/1989 |
| JP | S64-27795 | 1/1989 |
| JP | S64-27796 | 1/1989 |
| JP | S6427796 | 1/1989 |
| JP | H03-114699 | 5/1991 |
| JP | H11-218451 | 8/1999 |
| JP | 2000-343292 A | 12/2000 |
| JP | 2003-205395 | 7/2003 |
| JP | 2009-006352 | 1/2009 |
| WO | WO 03/043764 A2 | 5/2003 |

OTHER PUBLICATIONS

Gamlen, Michael, "The Gamlen Tablet Press", Retrieved from the Internet: URL: http://www.youtube.com/watch?v=ueNoDNvTIXM, Jul. 22, 2011, in 1 page.

International Search Report issued in PCT Application No. PCT/GB2012/050145, dated Apr. 25, 2012, in 4 pages.

Search Report issued in GB Application No. 1101603.7, dated Aug. 12, 2011, in 2 pages.

TABLET PRESS

The present invention relates to a tablet press and more particularly, although not exclusively, to a press for use in producing pharmaceutical tablets.

The large-scale production of tablets typically involves the use of tablet punches which operate to compact a volume of powder located in a die. The powder in the die is held between opposing punches which move together by a predetermined distance of travel to produce a tablet of controlled thickness within a die of known geometry. This is such that the formed tablet has a known or determinable density according to the die geometry and volume of powder used but there is no direct control of the force applied to the tablet during the compaction process.

The mass production of tablets requires that the movement of the punches and/or applied load is known in advance such that a tabletting machine can be set to reproduce tablets consistently. Such machines typically allow for cyclic loading of multiple punches such that tablets can be produced continually to known production rates. A conventional machine comprises a rotary press/punch configuration and a settable gearing mechanism so as to apply compaction pressure in a generally sinusoidal profile. Although the specific mechanics of different machinery may vary, such principles are generally accepted as being industry-standard.

Tabletting machines may be configured for either batch runs or continuous operation according to the above principles. In either case, the desire for repeatability in the compression process generally dictates that a rotary punch actuation configuration is used for large scale manufacturing.

Research into tablet formulations and production processes requires relatively small scale production and testing of tablets. An iterative approach to tablet production and testing is generally needed in order to converge on a satisfactory tablet formulation and corresponding compaction process.

Whilst smaller-scale tabletting machines, typically suited to batch production, are available in industry, such machines generally mimic the cyclic, rotary operation of their larger counterparts. Such machines are often provided with sensing equipment and associated software so that they can be used as compaction simulators for prediction of larger scale production parameters. Those machines are typically expensive, bulky and may require time-consuming setup procedures before production can be undertaken. Furthermore the batch sizes for which those machines are suited may be larger than is required for research work or other small-scale production.

It is an aim of the present invention to provide a tablet press which better provides for relatively small scale or ad hoc production.

The present invention may be considered to derive from the general principle of providing a relatively small and low cost tablet press that offers improved user control over individual or relatively small batch production of tablets.

According to the present invention there is provided a tablet press comprising a base and a press member held relative to the base by a spacer, the base comprising a die for receiving a powder in use, wherein the spacer depends from the base and is moveable relative thereto under the control of an actuator such that the press member is reversibly actuable between an at-rest condition in which the press member is spaced from the die and an actuated condition in which the press member is located in the die so as to apply a load to a powder therein.

The arrangement of the present invention may provide for a compact and lightweight machine which can be used to manufacture individual or small numbers of tablets.

Preferably the tablet press is portable. The tablet press may weigh less than, for example, 50 kg and preferably less than 30 kg. The tablet press may be of a size and shape such that it can be moved or carried by one person.

According to one embodiment, the actuator comprises an electric motor, which may comprise a DC motor. The motor may comprise a brushed motor. In other embodiments, an alternative electrically powered actuator could be provided, such as a solenoid.

In one embodiment, the actuator comprises a controller, which may comprise an electrical or electronic controller, such as a microcontroller. The controller may allow for digital control of the motor, which may be achieved using one or more of a number of control parameters such as force or displacement. The actuator may be controlled by the controller based upon a desired value of an operation variable input by a user. The combination of an electronic, or digital, controller and an electric actuator is particularly beneficial in providing for a highly configurable/controllable and portable, desktop press.

The controller may control the motor to undergo a single pressing cycle, or a small number of pressing cycles, in response to a user input. The user input may comprise a desired applied load to the powder and/or a desired tablet thickness. The controller may determine and/or modify pressing cycle parameters in accordance with a desired tablet characteristic, which may be input for example by an operator. The pressing cycle or actuation parameter determined by the controller may comprise any, or any combination, of a pressing load, a distance of travel or end position of the press member, a duration of pressing and/or a speed of travel of the press member.

The, or each, pressing cycle may comprise a pressing stage, during which a tablet is formed, and a tablet ejection stage. The pressing stage may comprise movement of the press member into the actuated condition followed by retraction there-from. The retraction may be to a return or at-rest condition. The ejection stage may comprise actuation of the press member into the die such that it contacts the tablet formed therein so as to dislodge the tablet from the die. The ejection stage may comprise opening a floor portion of the die for ejection of the tablet.

The actuator may drive the press member at a variable speed. The speed of press member actuation may be controlled by the controller, for example by application of a constant speed or fixed acceleration/deceleration profile, or else by dynamic speed control, for example based upon one or more sensed operational parameters, such as the load applied by the press member.

The press member may move at a first speed during a first portion of the pressing cycle, which portion typically comprises a pre- or post-compaction movement of the press member, and a second speed at a second portion of the pressing cycle, which typically comprises a compaction phase of the pressing cycle, wherein the first and second speeds may be different. The press member may be spaced from the die and/or powder in the first portion. The second portion may comprise a compaction phase of the press cycle, during which the press member enters the die and/or contacts the powder. The controller may control actuation of the press member at the second speed upon determination that the press member is at or adjacent the die opening.

The actuator may be arranged to drive the press member in a first, or compaction, direction and a second, or reverse, direction. The actuator may drive the press member in the first direction up to a predetermined condition. The condition may be a stop condition and may be determined by the location of the press member and/or load applied by, or to, the press member. The location of the press member may be determined relative to a datum point and/or the position of the die. Upon determination of the stop condition, the controller may control the actuator to cease actuation of the press member in the first direction. The actuator may cease actuation for a predetermined time and/or enter a reverse operation mode in which the press member is moved in a reverse direction.

The tablet press may comprise a load sensor. The load sensor may comprise a load cell. The load sensor may be arranged in the force path between the actuator and press member. For example the load sensor may be located in the force path between the spacer and the press member. The controller may record the maximum load on the press member in the actuation condition or during a compaction cycle. The controller may log the load on the press member at a plurality of times during a compaction cycle.

The spacer may comprise one or more arm or pillar formations. A pair of spaced, generally parallel spacers may be provided, typically with the press member being arranged there-between. The spacer may comprise a plurality of arm or pillar formations which may move uniformly in response to operation of the actuator.

The controller may receive or determine the location or travel distance of the press member. The controller may receive or determine the load on the press member. The controller may record data for the press member position and/or load at predetermined time intervals or positions. The recorded data or a part thereof may be output on a graphic display, for example on a screen and/or on a printout. Recorded data may be plotted as a graphical output. The controller may also determine the ejection load required to dislodge or eject the tablet from the die once formed.

In one embodiment, the base and/or die comprises a guide member, such as, for example, a funnel or chute. The guide member may depend from an open end of the die.

The die may comprise a die floor portion and an intermediate member having a recess or bore therein for reception of powder in use. The intermediate member may comprise an upstanding, typically tubular, member or portion of the die. The die floor and intermediate member may cooperate to define a die formation having a closed end. The die floor portion and intermediate member may be arranged for selective relative movement. The die floor may comprise a slider member arranged for movement relative to the intermediate member between a compaction condition and a tablet ejection condition. The die floor may comprise an opening which is offset from the intermediate member recess in the compaction condition and which is aligned with the intermediate member recess in the ejection condition.

The controller may comprise one or more processors in the base. The controller may comprise machine readable code in the form of one or more modules. The machine readable code may comprise software or firmware instructions for control of the actuator. Additionally or alternatively, the tablet press may comprise one or more ports or electrical connectors for connection with a separate control or processing means, which may comprise a personal computer or other conventional processing device. Preferably, the tablet press itself comprises a controller for controlling basic operation of the press and further functionality and/or control is provided by connection to an external processing means running bespoke machine readable code. The further functionality may comprise reporting or control tools.

The tablet press may comprise a user interface. The user interface may have one or more user input keys and/or a display screen.

The controller may operate under an open or closed loop in dependence on the sensed operating conditions, such as the load or position of the press member.

According to one embodiment, the press member is arranged such that its free end in use defines a surface of the produced tablet. The tablet may be formed according to a shape defined by the die floor, the intermediate member recess and the press member.

The present invention is particularly useful for research work or other small scale manufacture since it allows tablets to be produced individually or in small numbers, wherein the compaction load and/or dimensions of each tablet are known upon production. This is particularly useful when testing or evaluating different tablet formulations and compaction loads to determine a setup required to achieve a tablet having suitable mechanical properties. Such properties can affect the mechanical strength or hardness of the tablet as well as the tablet uniformity and the rate at which a tablet can disintegrate/dissolve in use.

Working embodiments of the invention are described in further detail below with reference to the accompanying drawings, of which.

Embodiments of the present invention described below allow for the provision of a tablet press which is portable.

Figure 1:
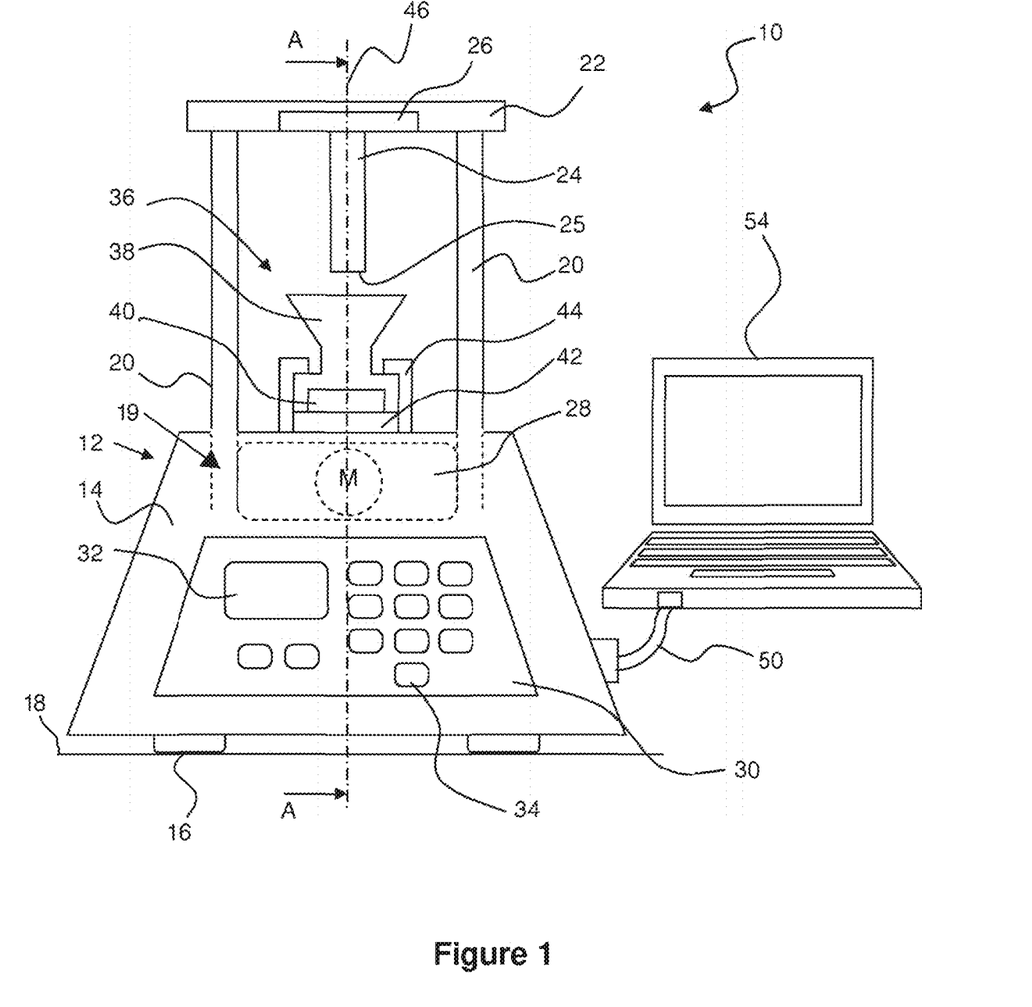
FIG. 1 shows a front view of a tablet press according to one embodiment of the present invention.

Turning to FIG. 1, there is shown a tablet press 10 having a base 12, which comprises a base housing 14. A lower region of the base 12 has feet 16 arranged to support the weight of the tablet press 10 on a suitable surface 18 for use.

In the upper surface of the housing 14 there are provided a plurality of openings 19, through which spacer arms, in the form of pillars 20, extend. The pillars 20 have a lower end which is located within the base housing 14 and an opposing upper end which protrudes above the base housing 14. The pillars 20 are arranged generally vertically when the feet 16 are on a horizontal surface 18.

At the upper end of the pillars 20, there is provided a support member 22 which extends between the pillars and which is arranged generally perpendicular to the longitudinal axes of the pillars. Mounted to the support member 22, there is provided a press member, which is referred to herein as punch 24. The punch 24 depends from the support member 22 at a location between, and typically equidistant from, the pillars 20. The punch 24 is elongate in form and extends towards the base 12 in a direction which is generally parallel with the pillars 20.

The punch is generally cylindrical in shape although other shapes are possible including oval, square or other shapes to which tablets are conventionally formed. The punch has a free end 25 which is blunt. The free end 25 defines in part the shape of a tablet formed by the tablet press 10 in use. Accordingly the free end may be flat or curved in a desired tablet profile. In this regard, it may be possible to provide the punch with interchangeable end sections to suit different tablet shapes. In such embodiments, the die shape will typically be interchangeable to correspond with the punch shape.

The support member 22 comprises a load sensor in the form of a load cell 26 arranged intermediate the punch 24 and the remainder of the support member. The punch 24, at its fixed end, may be mounted at or on the load cell 26, which may itself be mounted in a correspondingly shaped recess or formation in the support member. In alternative embodiments, the load sensor may be located in an alternative position, such as, for example, in the base 12 or elsewhere in the force path between the motor and base.

The support pillars 20 terminate at their lower ends within the base housing 14. Mounted within the base housing 14 is an electric motor assembly 28, which, in this embodiment, comprises a conventional brushed DC motor. However it will be understood that other types of motor may be used, such as, for example, brushless DC motors, including stepper motors. An electric motor is in many ways preferred as a suitable drive means for the tablet press due to the range of travel required by the pillars 20. However it should be noted that other forms of electromechanical drive or actuator could be considered provided they can allow for suitable linear displacement of the pillars 20 in use. In a further or alternative embodiment, feedback to the motor is provided, for example using a linear variable displacement transformer (LVDT)

The motor assembly 28 is shown schematically in FIG. 1 in cooperation with the pillars 20. Various configurations for uniformly driving the pillars 20 by the motor assembly 28 may be employed. For example the lower ends of the pillars 20 may be connected to a common cross member (not shown) and the motor 28 may be arranged to actuate the cross member such that the pillars are simultaneously driven by a single motor.

In this embodiment, the motor assembly 28 further comprises a linear servo amplifier which powers the motor. A digital encoder is also provided for the control of the motor. In this embodiment the encoder is an integral part of the motor assembly 28 within the base housing 14. Thus, in use, the angular position of the motor is determinable and digitally controllable as will be described in further detail below.

A user interface 30 is provided, for example on a panel of the base housing 14, and comprises a display screen 32 and a plurality of keys 32 in the form of a keypad. The keys allow for alphanumeric character entry by a user in a conventional manner.

In the upper portion of the base housing 14, there is provided a die assembly 36 comprising a die member 38 and a die floor or base 40. The die member and die floor are held in position against a plate 42 on the base 12 by retaining formations 44.

The members 40-44 are elongate in form and sectional profile of those members is generally constant. That is to say, the end profile shown in FIG. 1 extends in a direction into the page.

The die assembly and the pillars and punch 24 are generally symmetrical about axis 46 which is also the direction of travel of the punch 24 in use. In the orientation shown, the axis 46 is generally vertically aligned.

A force path can be defined between the motor assembly 28, the pillars 20, the support member 22, including the load cell 26, and punch 24. Accordingly a load applied by the motor can be communicated to the punch 24 such that the punch applies a load to powder in the die. Any reaction to the applied load experience by the punch 24 can be recorded by the load cell 26. The motor 28 and load cell 26 are typically arranged to allow for a load of up to approximately 500 kg or 4900 N.

Figure 2:
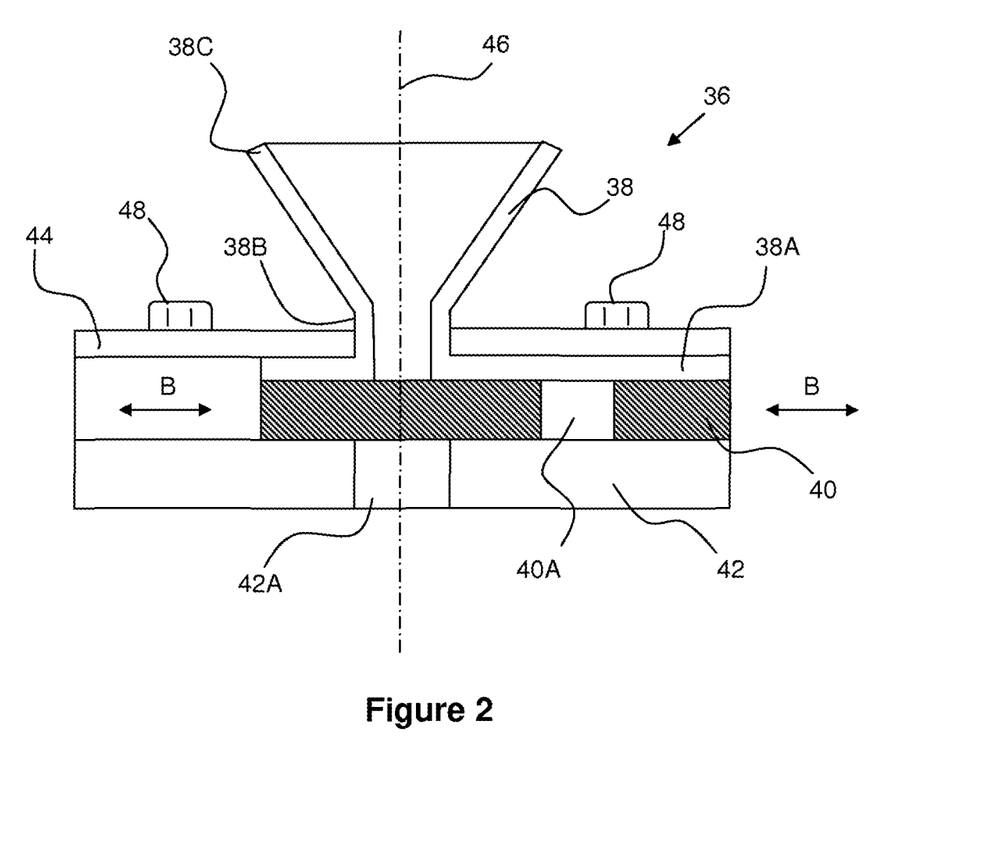
FIG. 2 shows a section view of the die region of the press of FIG. 1, taken through the plane A-A.

Turning now to FIG. 2, further details of the die assembly 36 are shown. The die member 38 has a first portion 38A which is shaped for location of the die member 38 relative to the die floor 40 and base housing 14. In this regard, the first portion 38A in cross section generally takes the form of an inverted channel or U-shaped formation. The channel side walls rest on the plate 42 or the base housing 14 directly so as to define an open ended channel. The die floor 40 is insertable in the channel of the first portion between the channel side walls.

A second portion 38B of the die member depends upwardly from the first portion 38A and is shaped to define the die in which a tablet is formed in use. The second portion has an upstanding wall which is generally tubular or toroidal in shape and has a central bore aligned with axis 46, into which powder can be inserted.

A third portion 38C of the die member depends upwardly from the second member and comprises an open ended funnel formation which is aligned with the common axis 46. The funnel 38C has an upwardly facing open mouth which tapers towards a narrow opening which leads into the bore of the die section 38B.

When assembled for use, the first portion 38A is positioned relative to plate 42 and beneath the retaining formations 44 such that the die 38B is aligned with the axis 46. The die floor member 40 is inserted into the channel of the first portion 38A such that it closes the die at its lower end. In this regard, the die floor member may be considered to act as a closure.

The die floor 40 is elongate in form and has an opening 40A part way along its length. The opening 40A takes the form of a through hole. The opening 40A has a width or diameter which is slightly larger than that of the die 38B. In the tablet-forming condition, as shown in FIG. 2, the opening 40 A is offset from the die such that the die is closed at its lower end. The lower plate 42 also has an opening or recess 42A therein. The recess 42A is the same or slightly wider than the opening 40A in the die floor 40. The recess 42A is aligned with the die axis 46 but isolated there-from by the die floor 40 in the condition shown in FIG. 2.

One of more fixing members, such as for example through bolts or screws 48 pass through some or all of the components of the die assembly 36 in order to hold the assembly securely in place for use. The fixing members may be received in a corresponding formation within the base housing 14, such as, for example, a threaded bore (not shown).

In use, a powder is poured or otherwise inserted into the funnel 38C such that it falls into the die 38B and rests on the die floor member 40. In this regard, conventional means such as a powder pipette may be used to insert a measured amount of powder into the die. The pillars are then actuated by the motor 28 to displace the punch 24 downward towards the die member 38 in the direction of the common axis 46. The punch end 25 enters the die and applies a load to the powder therein so as to compact the powder into a tablet. The use of spaced pillars helps to ensure accurate axial displacement of the punch 24.

Once the tablet is formed the motor assembly actuates the pillars 20 in the reverse direction such that the punch 24 is retracted clear of the die.

The die floor 40 is then moved in a linear manner in the direction of arrow B in FIG. 2, such that the opening 40B is aligned with the die axis 46, beneath the die. The die floor is typically manually actuated but this process may be driven and/or automated in alternative embodiments.

The tablet can then be ejected by applying an ejection force to the tablet such that it is dislodged from the die and falls into opening 40A. The ejection force can be applied by a second actuation of the punch 24 by the motor 28. Alternatively, a separate ejection mechanism can be provided as necessary.

The tablet falls through the die floor 40 and is caught in the recess 42A in the plate 42. The plate 42 can later be slid out from beneath the die assembly to remove the tablet there-from. Such an arrangement is considered beneficial since it allows a tablet, once formed to be held in an enclosed space until access is required by the user. This may allow the tablet to remain enclosed, for example, whilst further tablets are being formed or else whilst other steps are undertaken before access to the tablet is required.

As an alternative to the arrangement of FIG. 2, the plate 40 may not have the recess 42A and the die base opening 40A may be used to hold the tablet until access is required by a user. The member 40 may thus be slid in a reverse direction to access the tablet in the opening 40A.

Figure 3:
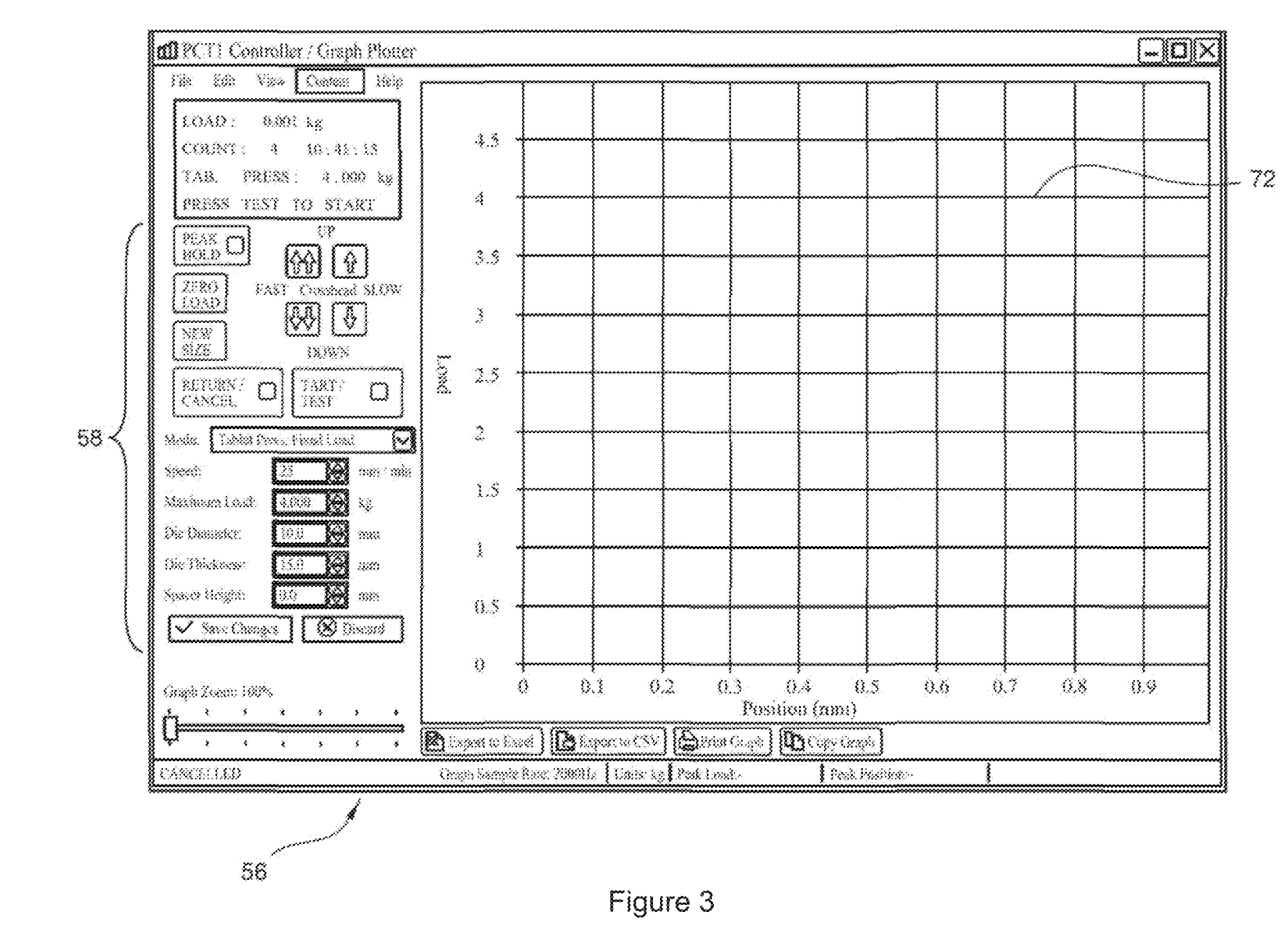
FIG. 3 shows a graphical user interface for control and/or reporting of the tablet press according to one embodiment of the invention.
Figure 4:
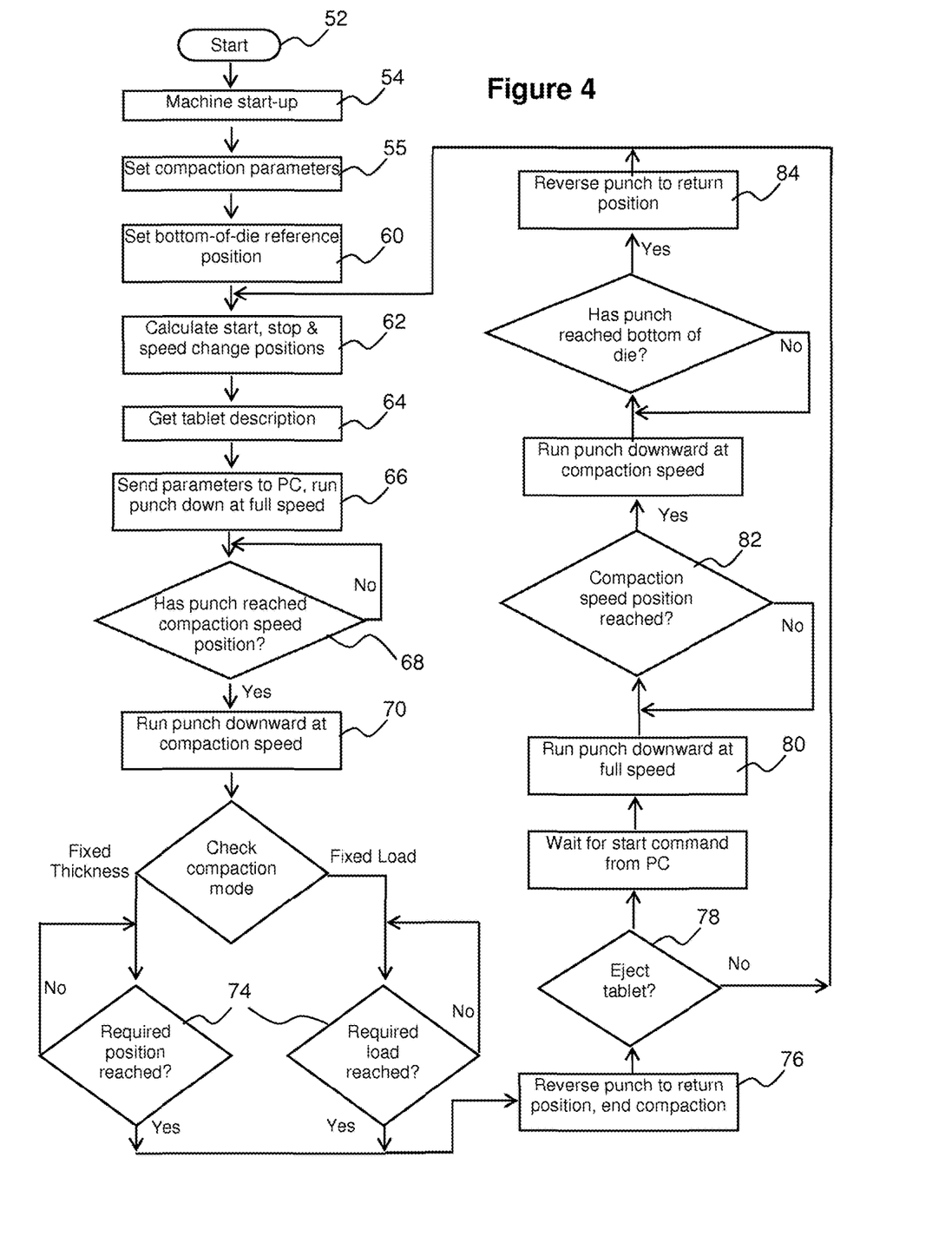
FIG. 4 shows a flow diagram of tablet press operation according to one embodiment of the invention.

The operation and control of the tablet press by a controller will now be described in further detail with reference to FIGS. 3 and 4. To this end, the tablet press 10 comprises one or more processors, typically in the form of a microchip, and a data store or memory for controlling actuation of the punch by the motor 28 in accordance with user inputs.

The tablet press further comprises means for establishing a data connection with a separate computing means. In this embodiment, an electrical connector 50 in the tablet press 10 is connected by a lead 52 to a laptop 54. Additionally, or alternatively, a wireless data link may be established in different embodiments by providing the tablet press with conventional wireless data transfer hardware, such as may be required for data transmission/reception by radio using, for example Wi-Fi, GSM, 3G, Bluetooth or other communication standards.

Whilst a laptop 54 is shown in FIG. 1, the reader will appreciate that numerous forms or alternative computational equipment exist which could be substituted, such as, for example, a desktop personal computer, PDA, mobile/cell phone, computer tablet or similar.

The operating system for the tablet press comprises two parts. The processor in the tablet press 10 itself is provided with machine-readable code in the form of firmware. The PC 54 is provided with software that controls the display of an on-screen user interface, an example of which is shown in FIG. 3.

Reference will now be made to the flow chart of FIG. 4, which shows an example of a tablet compaction routine in the firmware. After switching the tablet press on at 52, the firmware enters a machine start-up sequence at which point the tablet press waits until the PC software is started.

The tablet press then initialises by actuating the motor 28 such that the punch is moved to a fully retracted position. This position serves as the datum position for the machine. Any settings stored in the memory from a previous instance of use are retrieved from the memory.

Once the tablet press firmware establishes data communication with the PC, tablet pressing parameters can be set at 55 or altered using the user interface 56 on the PC. The parameters that are required for entry or upload by a user comprise the following:

a. Compaction mode: Either fixed thickness or fixed load modes are available. In fixed thickness mode, the contents of the die will be compacted until the die reaches a specified position. In fixed load mode, the compaction continues until a specified load is applied to the punch (as determined by the load cell 26);

b. Target thickness or load: The desired tablet thickness or maximum load, depending on the mode set in (a) above;

c. Compaction speed;

d. Die diameter: This is for information and is shown on the header of exported reports, but, in this embodiment, has no bearing on the compaction itself;

e. Die thickness: The total thickness of the die, which is used to calculate positions during the compaction routine.

The above data and or instructions are entered by the user using the buttons and alphanumeric character entry boxes in the region 58 of the graphical user interface 56.

Before a compaction can be started, the position of the bottom of the die is established by the firmware at stage 60. The insertion of different dies into the press may change this parameter. The determination of the location of the floor of the die relative to the datum position at 60 is achieved by placing the empty die in the machine and starting the 'new size' procedure. The firmware controls actuation of the punch 24 downwards until it touches the die floor member 40. The distance of travel and/or position of the die floor 40 relative to the datum position is stored. The punch 24 then retracts out of the die 38.

The die is now loaded with powder by a user. This may be achieved by removing the die 38 or die assembly 36 and inserting powder therein using a suitable dispensing device. Alternatively this may be achieved in-situ. Once the die and powder therein is correctly positioned in the tablet press 10, the compaction stage can begin.

The compaction is started from the PC. The firmware is able to calculate a number of positions at point 62 in FIG. 4, comprising:

i. Stop position: this is used in 'fixed thickness mode', and is defined as the bottom-of-die reference position minus the target thickness set at stage 55;

ii. Compaction speed position: this is the position at which the punch switches from full speed movement to compaction speed, as set in stage 55 above, and is defined as a predetermined distance above or below the top of the die, such as for example 5 mm below the top of the die in this example;

iii. Return position: The position the punch returns to after the compaction, defined as a predetermined distance above or below the top of the die, such as for example 2 mm above the top of the die in this example.

At 64, a tablet description (identifier) can be input by the user via the PC interface. This is shown on exported reports.

The determined parameters are sent back to the PC by the tablet press firmware at 66, along with an indication that the compaction is starting.

The firmware then controls operation of the motor 28 in conjunction with the digital encoder such that the punch 24 moves downwards at full speed until the compaction speed position (as calculated at stage 62) is reached. This position is determined by control loop 68, at which point the firmware controls the change in operation of the motor 28 to operate the punch at the compaction speed, which is constant for the compaction phase of the process.

At 70 the punch 24 continues its downward movement such that it comes into contact with powder in the die. The change to compaction speed also triggers a signal from the tablet press to the PC such that the PC software will start plotting a graph of load against position for the punch in window 72 of the user interface 56. The load reading is taken from the load cell 26 and the position is determined by the angular position of the motor in accordance with the digital encoder.

Further downward movement of the punch compacts the powder in the die. Compaction continues under the control loop 74 until either: the stop position (calculated in (i) above) is reached, when in the 'fixed thickness' mode; or, the target load (set in b above) is reached, when in the 'fixed load' mode. In either mode, the compaction will be aborted if the load cell is overloaded.

The punch then stops. The punch may be held for a predetermined period at this position. The motor is controlled to retract the punch at compaction speed for a predetermined distance, such as, for example 2 mm. Graph plotting then ends. The motor then actuates the punch in the retraction direct at full speed to the datum position at 76.

The user is given the option to eject the tablet from the die at 78. If this is manually declined by the user, the routine ends and the firmware returns to a ready condition for a further compaction.

If ejection is desired, the user slides the die floor 40 to its open condition such that the opening 40A is below the die, and clicks a button in the PC user interface to commence the ejection procedure. During ejection, the punch initially runs downward at full speed at stage 80, until the compaction speed position is reached. The punch then continues at compaction speed at stage 82. This motor control sequence is similar to that of the compaction itself and is not repeated here for conciseness.

However, instead of monitoring, the compaction criteria described above, upon ejection the controller instead determines whether the punch end 25 has reach end has reached the location of the bottom of the die (i.e. the location at which the floor member 40 was previously present). Once the bottom of the die is reached, the punch reverses to the return position.

The tablet press and associated firmware now return to a ready condition in which the tablet press is able to start the next compaction, or for settings to be altered.

Whilst the above embodiments make use of both on-board firmware and external computer software, it is to be noted that the tablet pressing process can be carried out entirely under the control of the machine firmware if necessary. The user may enter the necessary data using the keys 34 in response to simple prompts on display screen 32. However it is felt that the combined use of basic firmware and more advanced software running on a connected computer offers useful functionality that would otherwise add expense to a stand-alone tablet press device. However any, or any combination, of on-board and remote or external data processing is envisaged as being possible based on the foregoing description. Any reference to a 'controller' herein may refer to one or more processors arranged either onboard the tablet press or in communication therewith to achieve the desired control function.

Figure 5:
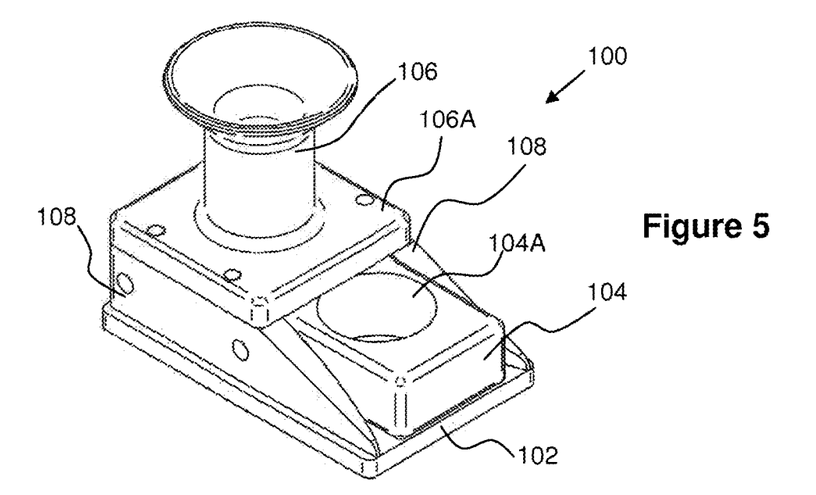
FIG. 5 shows a three-dimensional view of a further die.

Turning now to FIG. 5, there is shown a further embodiment of a die assembly 100 for use in conjunction with the base 12 of the tablet press. The die assembly 100 is substantially as described above in relation to the die 36 of FIG. 2. However in this embodiment, the base plate 102 of the assembly is substantially planar in form and devoid of any opening for receipt of a tablet once formed.

The intermediate member 104 in this embodiment comprises a slider block or drawer member having an opening 104A therein, similar to that described above in relation to FIG. 2. The die member 106 in this embodiment has a first part 106A which is mounted to side walls 108 positioned on either side of the slider member 104. The combined side walls 108, the base plate 102 and the mounting portion 106A of the die provide an enclosure for the slider 104, through which the slider can be actuated, typically manually in forward and reverse directions between positions in which the opening 104A is respectively aligned and offset with the die. The enclosure is a close fit about the slider 104 and thus constrains the motion of the slider to a linear motion only.

Figure 6:
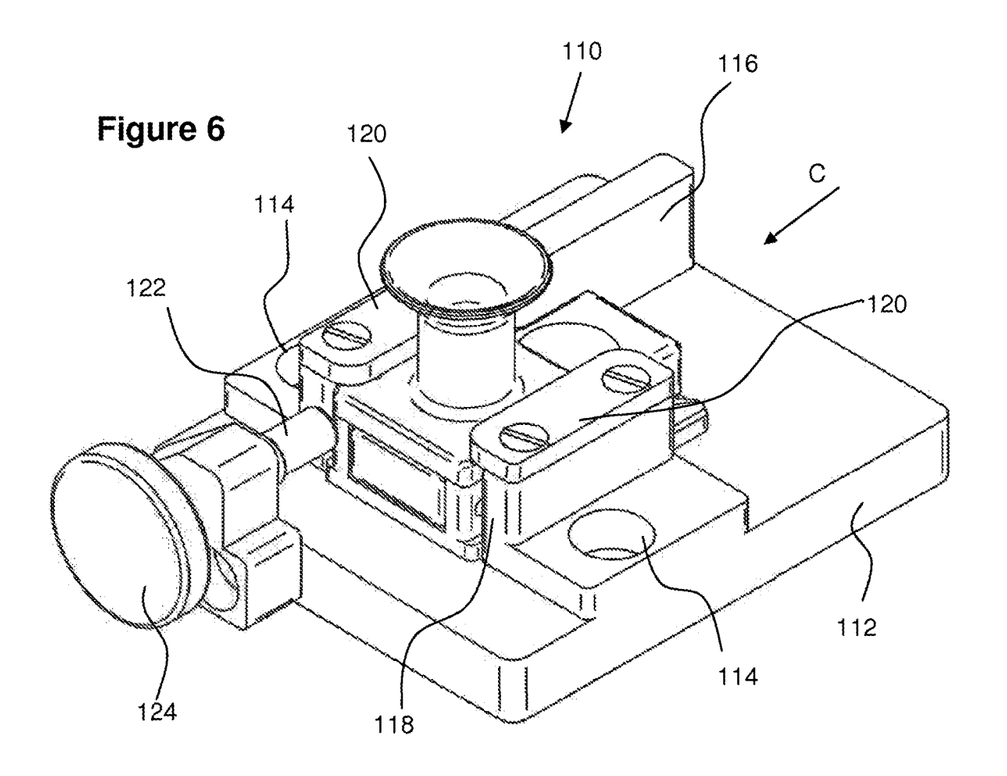
FIG. 6 shows a three-dimensional view of the die of FIG. 5 mounted within a die assembly.

In FIG. 6 there are shown further details of a die mounting assembly 110 that may be used to mount the dies of either FIG. 2 or 5 to the base 12, and typically to an upper surface of the housing 14 thereof. The mounting assembly 110 comprises a supporting member 112 which generally takes the form of a block or plate-like member having a planar/flat upper surface on which the die assembly 100 is mounted for use. The supporting member 112 is mounted on the upper portion of the base 12 of FIG. 1 for use and provides a stable platform for location of the die relative to the press member 24. The supporting member has through holes 114 arranged to accommodate the pillars 20.

A pair of spaced retaining walls 116 and 118 are upstanding from the member 112 and are aligned (i.e. extending in parallel directions). The wall 118 is purposely shorter than the wall 116 for ease of loading the die assembly. The die assembly 100 of FIG. 5 is a close fit between the retaining walls 116 and 118 to ensure accurate positioning of the die. Each of the retaining walls comprise a flange formation 120 spaced from the upper surface of the supporting member 112 by a distance which is substantially equal to the depth of the body of the die assembly. Accordingly the flanges 120 serve to retain the die assembly correctly against the upper surface of support 112 such that the height of the die relative to the support (and the base of the press) is fixed.

As seen in FIG. 6, it will be appreciated that the die assembly 100 can slide into position between the retaining walls 116 and 118 in the direction of arrow C, such that its height and lateral position is fixed relative to the base 12 and press member 24. A stop member 122 is provided at one end of the channel defined by the retaining walls. Thus the die assembly can be slid into abutment with the stop member so as to fix the longitudinal position of the die assembly for use. The stop member is adjustable by way of a knob 124 such that the longitudinal position of the die assembly can be manually altered to align the die beneath the press member 24 for use. In this regard the stop member preferably comprises a threaded shaft portion which is received in a correspondingly threaded bore, for example in the manner of a thumb screw.

Once the die assembly has been located in the die mounting assembly 110 atop the base 12, the operation of the tablet press can be carried out as described above. FIGS. 5 and 6 show the die assembly in a compaction condition with the recess 104A offset from the die. When a tablet is ejected from the die, the slider can be actuated to a position in which the recess 104A is beneath the die, thereby allowing ejection of the tablet into the recess. A reverse sliding actuation of the slider 104 allows removal of the tablet by the operator whereby the ejected tablet contained in the recess 104A is exposed for removal of the tablet. In this regard the base plate 102 has a greater length than the die mounting portion 106A to allow the opening 104A to slide out from beneath the die.

The present invention is particularly advantageous since individual or small batches of tablets can be produced under known compaction parameters which have been entered by a user. The compaction parameters for each tablet produced can be individually set by a user.

The invention claimed is:

1. A tablet press comprising:
a base;
a press member separated from the base by a spacer, the base comprising a die for receiving a powder in use, the die having a die floor opposing the press member, wherein the spacer depends from the base and is moveable into and away from the base under the control of an electric motor such that the press member is reversibly actuable towards and away from the die floor between an at-rest condition in which the press member is spaced from the die and an actuated condition in which the press member is located in the die and applies a load to a powder therein;
an actuator;
a load sensor arranged in the force path between the actuator and press member for determining a compacting load applied by the press member to the powder in the die;
a digital encoder for the electric motor;
an electronic controller for controlling the angular position of the motor automatically according to an open or closed feedback loop based upon a sensed position of the press member relative to the die floor and the compacting load applied by the press member.

2. A tablet press according to claim 1, wherein the tablet press is portable.

3. A tablet press according to claim 1, wherein the controller is arranged for digital control of the actuator via the digital encoder.

4. A tablet press according to claim 1, wherein the controller controls the electric motor to undergo a single pressing cycle in response to a user input, wherein the pressing cycle comprises a first actuation of the press member to compact powder in the die and thereby form a tablet and a further actuation of the press member to eject the tablet from the die.

5. A tablet press according to claim 1, wherein the speed of actuation of the pressing member is controlled by the controller to be constant during a compaction phase of a pressing cycle.

6. A tablet press according to claim 1, wherein the actuator is controlled by the controller based upon a value of a desired applied load and/or a desired tablet dimension input by a user, and wherein the controller automatically controls cessation and/or retraction of the press member by the actuator according to the open or closed feedback loop.

7. A tablet press according to claim 1, wherein the controller is arranged to record instantaneous values of the press member position and the compacting load at predetermined time intervals or positions during a pressing cycle.

8. A tablet press according to claim 7, wherein the angular position of the motor and the digital encoder provide a position sensor for determining the location of the press member relative to the die.

9. A tablet press according to claim 7, wherein the controller controls cessation or reversal of the press member actuation upon determination that the press member position and/or compacting load has met or exceeded a predetermined value.

10. A tablet press according to claim 7, wherein the controller records data pertaining to said operational variable values and allows for plotting of said data on a graphical display.

11. A tablet press according to claim 1, wherein the spacer comprises a plurality of pillars, said pillars being arranged to move uniformly in response to operation of the actuator and the press member depends from a support member spanning said pillars, the load sensor comprising a load cell arranged to sense the load between the press member and the support member.

12. A tablet press according to claim 1, comprising a guide member depending from an open end of the die for guiding powder into the die.

13. A tablet press according to claim 1, wherein the die comprises a die floor member which is moveable between a closed condition for forming a tablet and an open condition which allows for ejection of the tablet from the die.

14. A tablet press according to claim 13, wherein the die floor comprises a slider plate having an opening therein, said opening being offset from the die in the closed condition and aligned with the die in the open condition.

15. A tablet press according to claim 1, wherein the controller controls the electric motor for each tablet formed to undergo a pressing cycle comprising a first actuation of the press member to compact powder in the die and a further actuation of the press member to eject the tablet from the die, wherein the controller records both a powder compacting load during the first actuation and an ejection load required to dislodge or eject the tablet from the die during the further actuation.

16. A tablet press according to claim 15, wherein the controller further records one or more dimension of the formed tablet according to the sensed position of the press member.

17. A tablet press according to claim 1, wherein the controller triggers recordal of a plot of the compaction load against the position of the press member during compaction.

18. A tablet press according to claim 17, wherein the controller controls a speed of movement of the press member at a first speed until a predetermined position of the press member relative to the die is reached and a compaction speed which is slower than the first speed beyond said predetermined position.

19. A tablet press according to claim 1, comprising a linear variable displacement transducer for providing position feedback to the controller for controlling the motor.

20. A tablet press according to claim 1, wherein the electric motor comprises a linear servo amplifier.

* * * * *